United States Patent
Kobayashi et al.

(10) Patent No.: US 6,935,573 B2
(45) Date of Patent: Aug. 30, 2005

(54) EXPANSION VALVE (75) Inventors: Kazuto Kobayashi, Tokyo (JP);
Masamichi Yano, Tokyo (JP);
Kazuhiko Watanabe, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 89 days.

(21) Appl. No.: 10/600,429

(22) Filed: Jun. 23, 2003

(65) Prior Publication Data

US 2004/0016260 A1 Jan. 29, 2004

(30) Foreign Application Priority Data

Jun. 27, 2002 (JP) ........................................ 2002-187936

(51) Int. Cl.⁷ ............................................... F25B 41/04
(52) U.S. Cl. ...................................... 236/92 B; 62/225
(58) Field of Search ........................... 62/225; 236/92 B (56) References Cited

U.S. PATENT DOCUMENTS

| | | | | |
|---|---|---|---|---|
| 4,979,372 A | * | 12/1990 | Tanaka ......................... | 62/225 |
| 5,060,485 A | * | 10/1991 | Watanabe et al. ............. | 62/225 |
| 5,127,237 A | * | 7/1992 | Sendo et al. .................. | 62/225 |
| 5,269,459 A | | 12/1993 | Thompson et al. | |
| 6,062,484 A | * | 5/2000 | Eybergen ................... | 236/92 B |
| 6,112,998 A | * | 9/2000 | Taguchi ..................... | 236/92 B |
| 6,626,365 B2 | * | 9/2003 | Kobayashi et al. ........ | 236/92 B |

FOREIGN PATENT DOCUMENTS

| | | |
|---|---|---|
| EP | 1043553 A2 | 10/2000 |
| JP | 08-29019 A1 | 2/1996 |
| JP | 08-152232 A1 | 6/1996 |
| JP | 11-351440 A1 | 12/1999 |
| JP | 1262698 A2 | 12/2002 |

OTHER PUBLICATIONS

European Search Report dated Mar. 9, 2004.

* cited by examiner

*Primary Examiner*—William E. Tapolcai
(74) *Attorney, Agent, or Firm*—Rader, Fishman & Grauer PLLC (57) ABSTRACT

An expansion valve 1 comprises a piping member 10 having passages to which pipes for refrigerant are connected, and a cassette unit 100, which are formed as separate components. The cassette unit 100 comprises a flange portion 111 and a tube member 110 which are welded together, and to the interior of which are fixed a guide member 170, an orifice member 180 and a plate member 166. According to the pressure of gas filled in a gas charge chamber 122 defined by a lid 120 and a diaphragm 130, the diaphragm 130 is displaced, the movement of which is transmitted through a stopper 140 to a shaft member 150. The shaft member 150 is guided by a guide member 170 and drives a valve member 160 disposed within a valve chamber 161. The cassette unit 100 is inserted to the piping member 10 and fixed by a ring 50. Seal members 62, 64, 66 are fit to necessary areas.

11 Claims, 9 Drawing Sheets

EXPANSION VALVE

FIELD OF THE INVENTION

The present invention relates to an expansion valve for use in a refrigeration cycle of an air conditioner of a car or the like.

DESCRIPTION OF THE RELATED ART

For example, Japanese Patent Laid-Open No. 8-152232 discloses an expansion valve comprising an expansion valve body and a separately formed functional member containing a diaphragm chamber, wherein the expansion valve is formed by assembling this separately formed functional member to the valve body. Further, a spring is disposed within a temperature sensing case, enabling the length between the spring receiver to be controlled using a screw mechanism. A similar expansion valve structure is disclosed in Japanese Patent Laid-Open No. 11-351440.

According to the expansion valve disclosed in above-mentioned Japanese Patent Laid-Open No. 8-152232, the screw mechanism is equipped to the mounting portion of the temperature sensing case, and a screw mechanism is further utilized when fixing the body of the functional member to the valve body, by which the overall structure of the expansion valve becomes complex.

SUMMARY OF THE INVENTION

The object of the present invention is to provide an expansion valve comprising a piping member and a cassette unit provided with the functions of the expansion valve, so that the overall structure of the expansion valve is simplified greatly.

In order to achieve the above object, the present invention provides an expansion valve comprising: a flange portion; and a tube member formed separately from the flange portion; the tube member having fixed to its interior a guide member, an orifice member and a plate member; the tube member further comprising a shaft member passing through the guide member and the orifice member and driving a valve member disposed within a valve chamber defined by the orifice member, a spring supported by the plate member and biasing the valve member toward the orifice member, a lid member sandwiching between the flange portion a diaphragm and defining a gas charge chamber, and a stopper member in contact with the diaphragm and transmitting the displacement of the diaphragm via the shaft member to the valve member; wherein the lid member is fixed to the flange portion with the diaphragm sandwiched therebetween, the flange portion is integrated with the tube member, and the gas charge chamber together with the diaphragm constitutes a drive mechanism of the valve member.

Moreover, the present invention characterizes in that the flange portion is integrated with the tube member through welding.

Even further, the present invention characterizes in that the flange portion and the lid member are fixed together by welding.

Furthermore, the present invention characterizes in that the guide member, the orifice member and the plate member are fixed to the tube member through caulking.

Further, the present invention characterizes in that the tube member is formed as a separate component and welded together.

DETAILED DESCRIPTION OF THE PREFERRED EMBODIMENT

Figure 1:
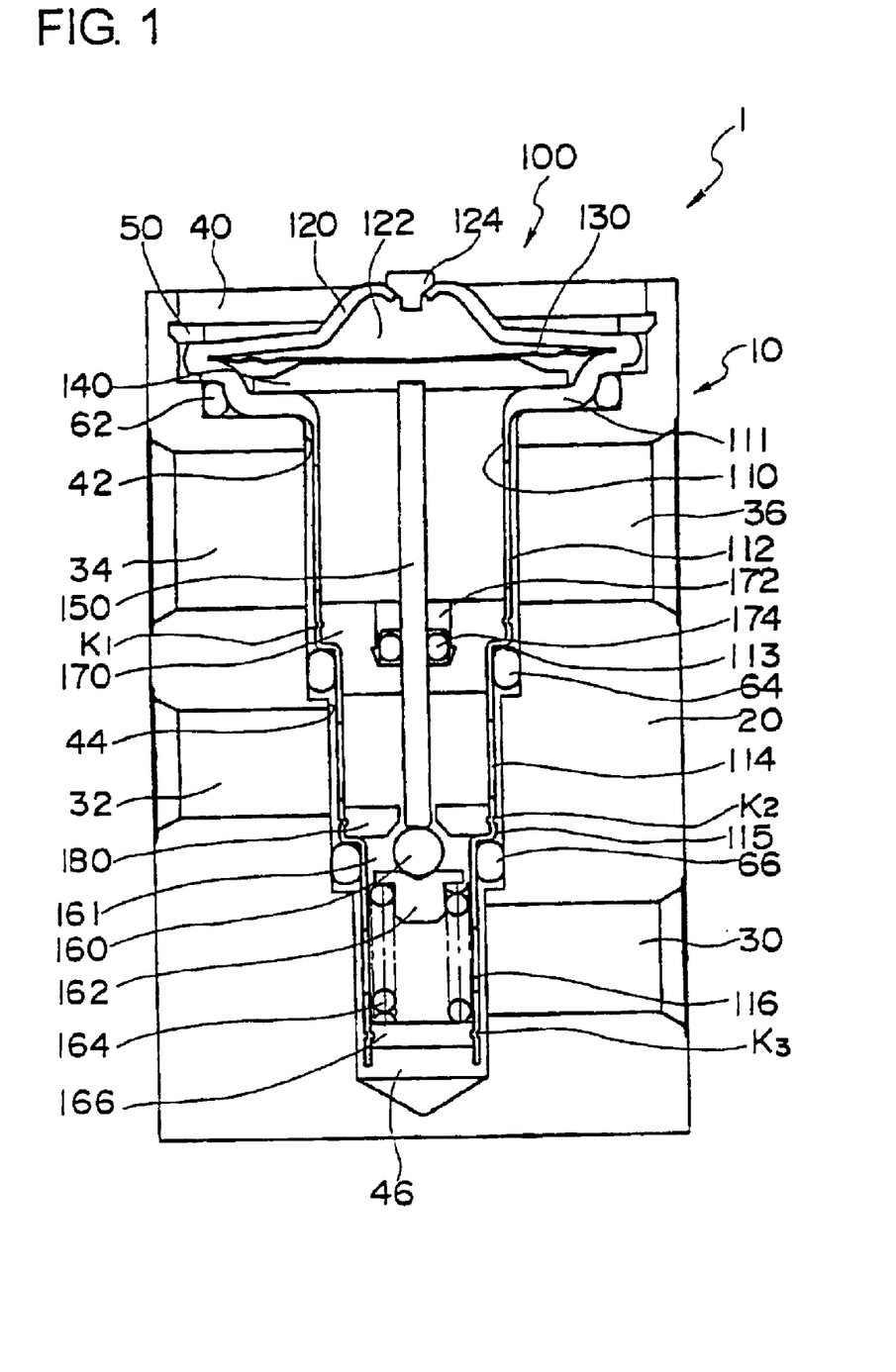
FIG. 1 is a cross-sectional view showing the overall structure of the expansion valve according to the present invention.

FIG. 1 is a cross-sectional view showing one preferred embodiment of an expansion valve with a cassette structure according to the present invention.

The expansion valve, the whole structure of which is designated by reference number 1, comprises a piping member 10 and a cassette unit 100 formed as separate members.

The piping member 10 has a body 20 formed of an appropriate material such as aluminum, and to the body are provided a path 30 to which a piping of a refrigerant supplied from a compressor not shown is connected, a path 32 to which a piping of a refrigerant traveling toward an evaporator (not shown) is connected, a path 34 to which a piping of a refrigerant returning from the evaporator is connected, and a path 36 to which a piping of a refrigerant returning to the compressor is connected.

At the center of the body 20 in the direction orthogonal to the refrigerant paths are provided bore portions 40, 42, 44 and 46 with steps. The bore portion 46 constitutes a hole with a bottom.

The cassette unit 100 inserted to the bore portion formed to the body 20 of the piping member 10 includes a tube member 110 formed by drawing stainless steel material and the like. The tube member 110 is formed integrally with a flange portion 111, and provided with step portions 113, 115. The end of the tube member 110 opposite from the flange portion 111 is open.

A stopper 140 is disposed in the flange portion 111, and a diaphragm 130 comes into contact with the upper surface of the stopper 140. The circumference of the diaphragm 130 is sandwiched by a lid member 120 and the flange portion, and the whole outer periphery of the lid member 120 is welded integrally and fixed thereto. The lid member 120 and the diaphragm 130 define a gas charge chamber 122, which is filled with a predetermined gas and sealed with a plug 124. The gas charge chamber 122 and the diaphragm 130 constitute the driving mechanism of the valve member.

The tube member 110 is provided with through holes 112, 114 and 116 through which refrigerant travels. A shaft member 150 comes into contact with the lower surface of the stopper 140, the shaft member 150 passing through a center hole 171 of the guide member 170 and an opening 181 of the orifice member 180 reaching a valve member 160 disposed within a valve chamber 161.

The spherical valve member 160 is supported by a support member 162, the support member 162 further supported via a spring 164 by a fixed plate 166.

A seal member 174 is inserted to the guide member 170 and fixed thereto by a support member 172. The seal member 174 guides the shaft member 150 and also seals any leak of refrigerant between the refrigerant path 32 leading to the evaporator and the refrigerant path 34 returning from the evaporator. The guide member 170 is fixed to the tube member 110 through a caulking portion $K_1$. Furthermore, the orifice member 180 and the fixed plate 166 are also fixed to position by caulking portions $K_2$ and $K_3$, respectively.

The cassette unit 100 is inserted to the bore portion of the body 20 of the piping member 10 and fixed thereto by a stop ring 50. Three seal members 62, 64 and 66 are fit between the cassette unit 100 and the bore portion of the body 20, thereby forming a seal between the outer periphery of the cassette unit 100 and the bore portion of the body 20 of the piping member 10.

According to this structure, the temperature of the low-pressure refrigerant passing through the refrigerant path 34, 36 from the evaporator toward the compressor is transmitted to the gas charge chamber 122 through the shaft member 150 and the stopper 140, according to which the pressure of the refrigerant filled in the gas charge chamber 122 changes. This change in pressure is transmitted as the displacement of the diaphragm 130 via the stopper 140 to the shaft member 150, driving the valve member 160 to move closer to or away from the opening 181 formed to the orifice member 180. In other words, the valve member 160 is driven to a position where the vapor pressure variation, the bias force of the spring 164 and the refrigerant pressure within paths 34 and 36 are balanced, and the refrigerant supplied from the compressor and passing the path 30 into the valve chamber 161 passes through the opening 181 of the orifice member 180 and expands thereby, before traveling through the path 32 toward the evaporator. Through the valve member, the amount of refrigerant sent out to the evaporator is controlled.

Since a clearance is provided between the outer periphery of the tube member 110 of the cassette unit 100 and the bore portion of the body 20 of the piping member 10, the paths 30, 32, 34 and 36 formed to the piping member 10 can be designed freely.

Thus, the degree of freedom of the piping is improved, and the layout of the air conditioner can be set arbitrarily.

The cassette unit 100 itself is equipped with all the functions of the expansion valve.

The piping member 10 exerts its function by comprising paths that can connect the refrigerant piping to the cassette unit 100 having the function of the expansion valve, so the shapes and structures of the paths can be designed freely.

However, the seal structure of the refrigerant provided between the cassette unit 100 and the piping member 10 must have a secure and reliable sealing capability.

On the other hand, the tube member 110 of the cassette unit 100 is manufactured by drawing a stainless steel material, so various structures can be employed considering its drawability.

Figure 2:
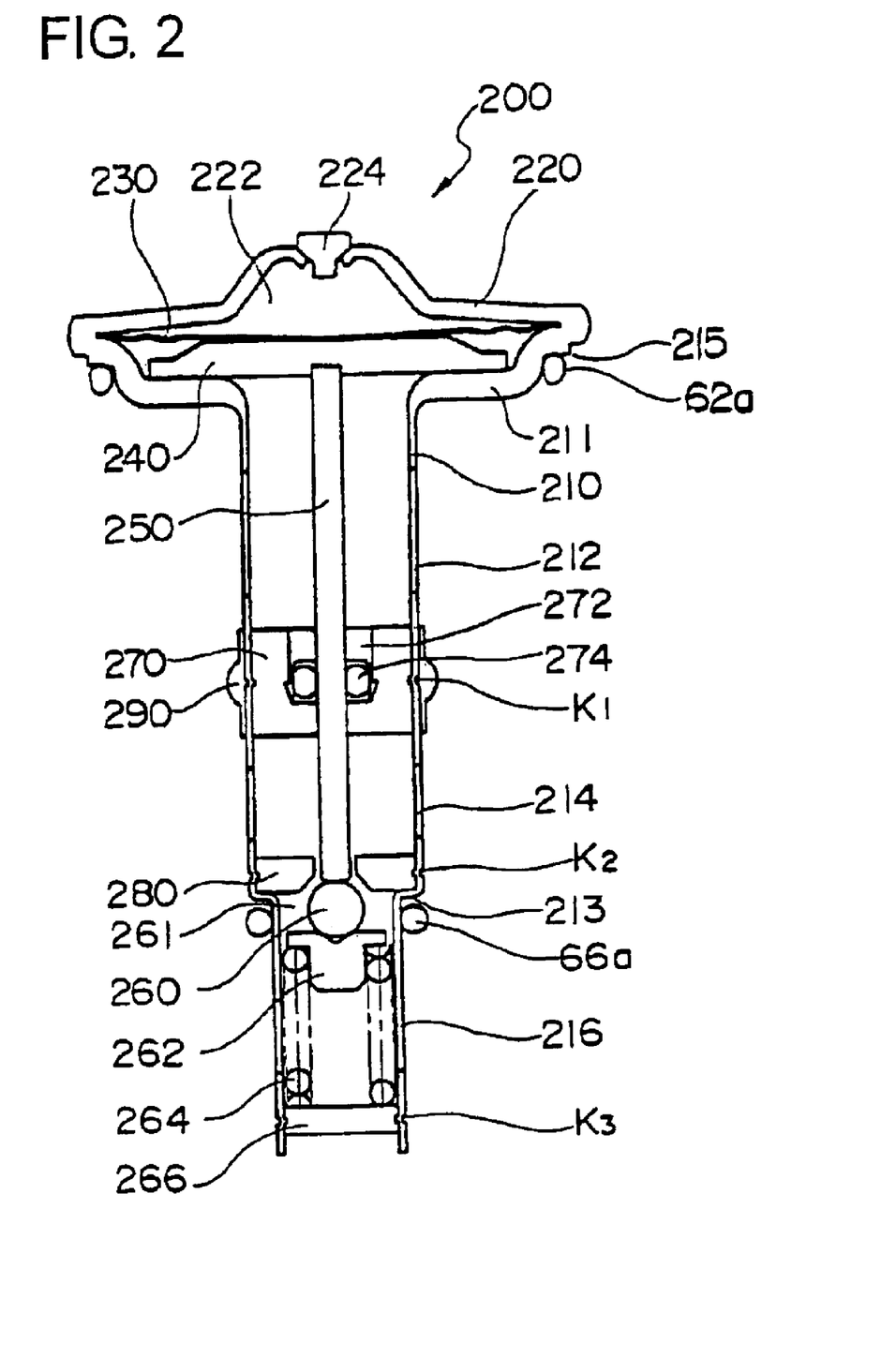
FIG. 2 is a cross-sectional view showing another example of the cassette unit of the expansion valve according to the present invention.

FIG. 2 is a cross-sectional view showing another preferred embodiment of the cassette unit of the present invention.

Compared to the structure shown in FIG. 1, the present embodiment adopts a structure with less step portions. The cassette unit shown as a whole by reference number 200 in FIG. 2 comprises a flange portion 211 and an integrally formed tube member 210, the tube member 210 having a step portion 213 and through holes 212, 214 and 216 through which refrigerant passes.

A stopper 240 is disposed in the flange portion 211, and a diaphragm 230 comes into contact with the upper surface of the stopper 240. The circumference of the diaphragm 230 is sandwiched by a lid member 220, which is welded to the flange portion. The lid member 220 and the diaphragm 230 define a gas charge chamber 222, which is filled with a predetermined gas and sealed with a plug 224.

A shaft member 250 comes into contact with the lower surface of the stopper 240, the shaft member 250 passing through the guide member 270 and the orifice member 280 and reaching a valve member 260 disposed within a valve chamber 261. The orifice member 280 is fixed to the tube member 210 by a caulking portion $K_2$.

A spherical valve member 260 is supported by the support member 262, and the support member 262 is supported via a spring 264 by a fixed plate 266. The fixed plate 266 is fixed to the tube member 210 by a caulking portion $K_3$.

A seal member 274 is inserted to the guide member 270, and fixed to position by a support member 272.

The seal member 274 guides the shaft member 250 and seals the leak between the refrigerant traveling toward the evaporator and the refrigerant returning from the evaporator.

The guide member 270 has a cylindrical outer circumference, and is fixed to the cylindrical portion of the tube member 210 by a caulking portion $K_1$. A rubber bush member 290 is fit to the outer circumference of the tube member 210 opposing the guide member 270.

The rubber bush member 290 creates a seal when the cassette unit 200 is inserted to the piping member 10 illustrated in FIG. 1. According to this structure, the flow of refrigerant can be controlled similarly as the example of FIG. 1, but with a tube member 210 having less step portions and thus is easily formed. When inserting the cassette unit, a seal member 66a is mounted on the step portion 213 of the tube member 210 and a seal member 62a is mounted on the step portion 215 of the flange portion 211.

According to the present example, the refrigerant flow can be controlled effectively similar to the example of FIG. 1 using a tube member 210 having less steps and thus is easily formed.

Figure 3:
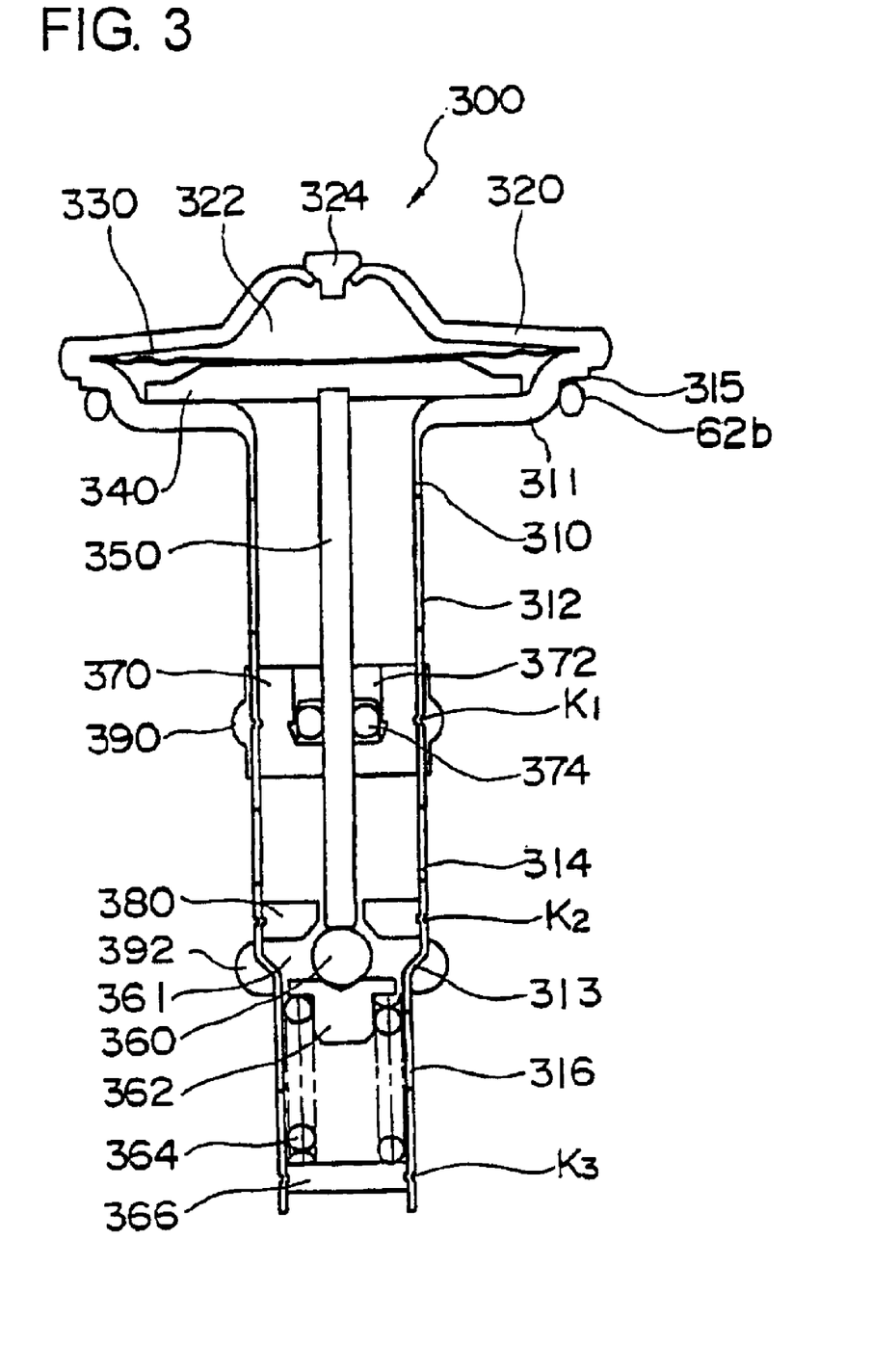
FIG. 3 is a cross-sectional view showing yet another example of the cassette unit of the present expansion valve.

FIG. 3 is a cross-sectional view showing another embodiment of the cassette unit of the present invention.

Of course, the cassette unit of the present embodiment is capable of controlling the flow of refrigerant in a similar manner as the example shown in FIG. 1.

In the drawing, the cassette unit shown as a whole by reference number 300 comprises a flange unit 311 and a tube member 310 which are formed as an integral unit, the tube member 310 having a step portion 313 and through holes 312, 314 and 316 through which refrigerant travels.

A stopper 340 is disposed in the flange portion 311, and a diaphragm 330 comes into contact with the upper surface of the stopper 340. The circumference of the diaphragm 330 is sandwiched by the flange portion and a lid member 320 which is welded integrally to position. The lid member 320 and the diaphragm 330 define a gas charge chamber 322, which is filled with a predetermined gas and sealed with a plug 324.

A shaft member 350 comes into contact with the lower surface of the stopper 340, the shaft member 350 passing through the guide member 370 and the orifice member 380 and reaching a valve member 360 disposed within a valve chamber 361. The orifice member 380 is fixed to the tube member 310 by a caulking portion $K_2$.

A spherical valve member 360 is supported by the support member 362, and the support member 362 is supported via a spring 364 by a fixed plate 366. The fixed plate 366 is fixed to the tube member 310 by a caulking portion $K_3$.

A seal member 374 is inserted to the guide member 370, and fixed to position by a support member 372.

The seal member 374 guides the shaft member 350 and seals the leak between the refrigerant traveling toward the evaporator and the refrigerant returning from the evaporator.

The guide member 370 has a cylindrical outer circumference, and is fixed to the cylindrical portion of the tube member 310 by a caulking portion $K_1$. A rubber bush member 390 is fit to the outer circumference of the tube member 310 opposing the guide member 370.

Furthermore, a rubber seal member 392 is mounted to the step portion 313 of the tube member 310 by baking. A seal member 62b is fit to the step portion 315 of the flange member 311. The rubber bush member 390 and the seal members 392 and 62b create a seal when the cassette unit 300 is inserted to the piping member 10 shown in FIG. 1.

Figure 4:
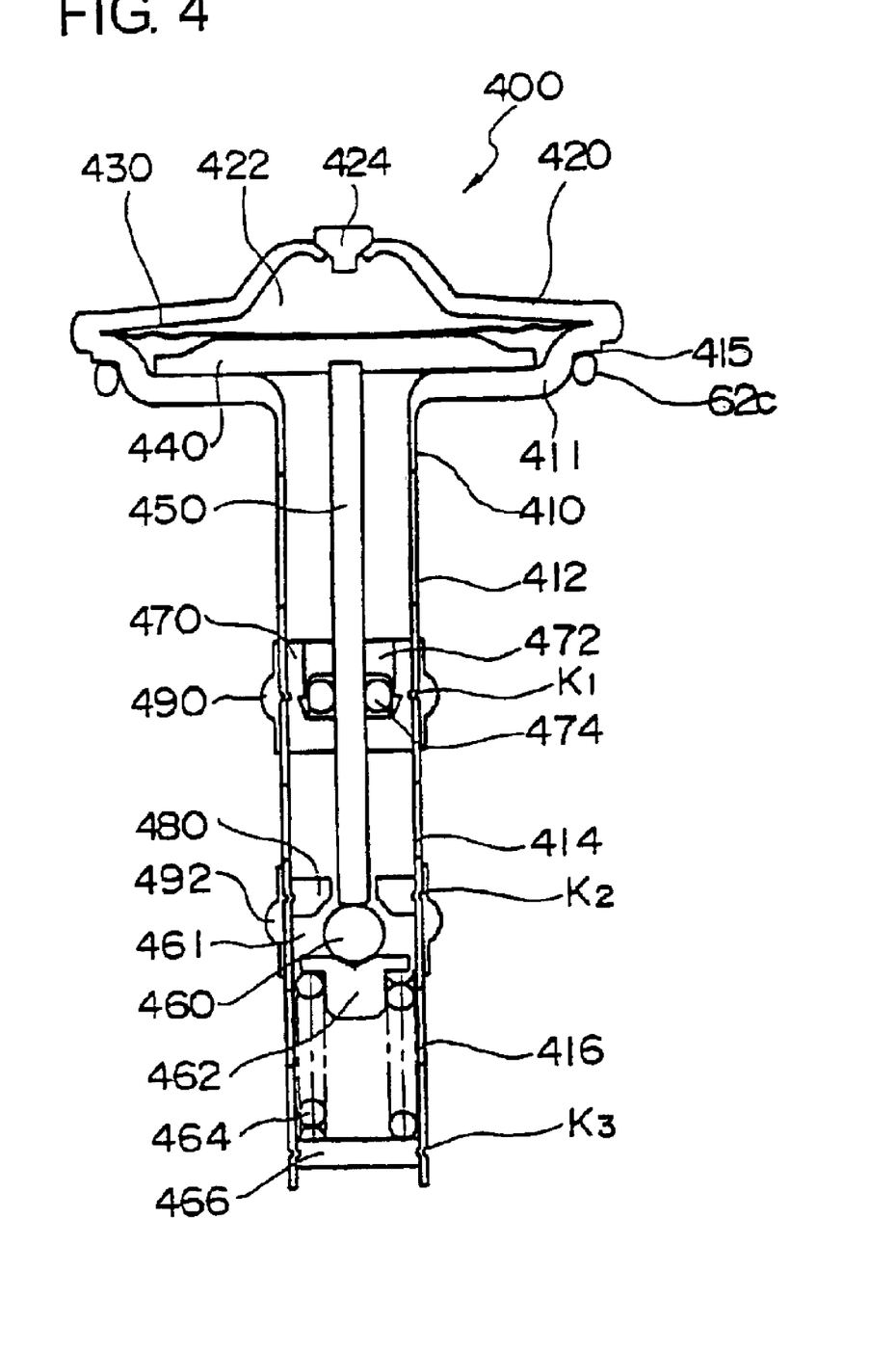
FIG. 4 is a cross-sectional view showing yet another example of the cassette unit of the present expansion valve.

FIG. 4 is a cross-sectional view showing yet another embodiment of the cassette unit according to the present invention.

The cassette unit of the present embodiment comprises a tube member without any step portion, and it is capable of controlling the flow of refrigerant in a similar manner as the example shown in FIG. 1.

In the drawing, the cassette unit shown as a whole by reference number 400 comprises a flange unit 411 and a tube member 410 which are formed integrally, the tube member 410 having a substantially straight cylindrical body with through holes 412, 414 and 416 through which refrigerant travels.

A stopper 440 is disposed in the flange portion 411, and a diaphragm 430 comes into contact with the upper surface of the stopper 440. The circumference of the diaphragm 430 is sandwiched by the flange portion and a lid member 420 which is welded integrally to position. The lid member 420 and the diaphragm 430 define a gas charge chamber 422 functioning as a heat sensing chamber, which is filled with a predetermined gas and sealed with a plug 424.

A shaft member 450 comes into contact with the lower surface of the stopper 440, the shaft member 450 passing through the guide member 470 and the orifice member 480 and reaching a valve member 460 disposed within a valve chamber 461. The orifice member 480 is fixed to the tube member 410 by a caulking portion $K_2$.

A spherical valve member 460 is supported by the support member 462, and the support member 462 is supported via a spring 464 by a fixed plate 466.

A seal member 474 is inserted to the guide member 470, and fixed to position by a support member 472.

The seal member 474 guides the shaft member 450 and seals the leak between the refrigerant traveling toward the evaporator and the refrigerant returning from the evaporator.

The guide member 470 has a cylindrical outer circumference, and is fixed to the cylindrical portion of the tube member 410 by a caulking portion $K_1$. A rubber bush member 490 is fit to the outer circumference of the tube member 410 opposing the guide member 470.

Further, a rubber bush member 492 is fit to the outer circumference of the valve chamber 461. A seal member 62c is mounted to a step portion 415 provided to the flange portion 411. The rubber bush members 490 and 492 and the seal member 62c constitute a seal when the cassette unit 400 is inserted to the piping member 10 shown in FIG. 1.

In the above-explained embodiments, the tube member of the cassette unit is formed integrally with the flange portion by drawing and the like, but the present invention is not limited to such example. The tube member and the flange member can be formed as separate members, which can be welded together to form the cassette unit.

Figure 5:
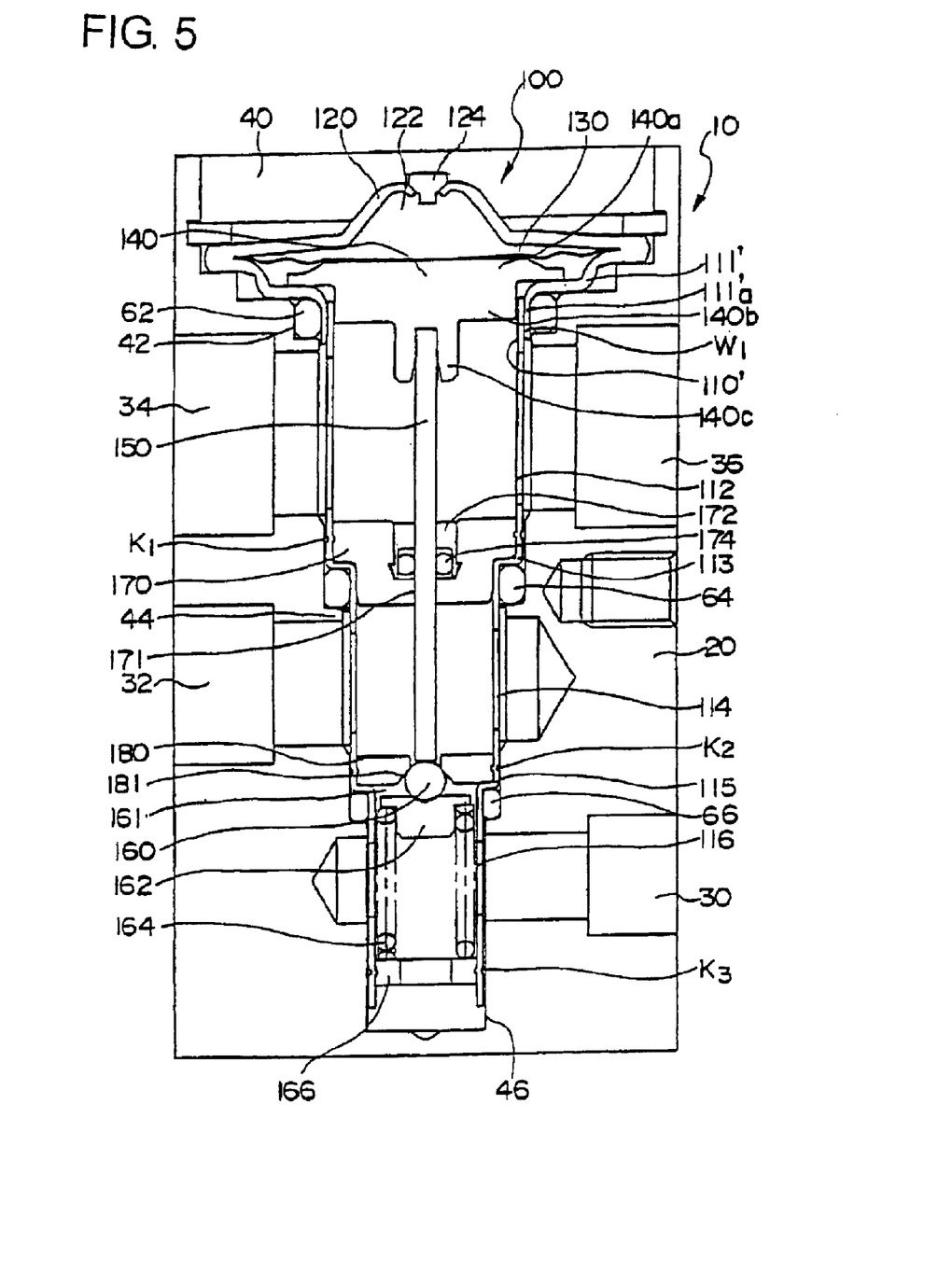
FIG. 5 is a cross-sectional view showing yet another example of the cassette unit of the present expansion valve.

FIG. 5 shows an example where the tube member and the flange member are formed as separate components. Compared to the embodiment illustrated in FIG. 1, the tube member and the flange member are formed as separate components. In FIG. 5, the components provided with the same reference numbers as those in FIG. 1 are same or equivalent components, wherein reference number 110' shows a tube member and 111' shows a flange member. The tube member 110' and the flange member 111' are formed separately, and the two members are assembled as a single component by welding the weld area $W_1$ of the cylindrical portion 111'a of the flange member 111' by TIG welding and the like.

According to the present arrangement, the circumference of the diaphragm 130 is sandwiched by the flange member 111' and the lid member 120, and in this state, the flange member 111' and the lid member 120 are fixed through welding to form a gas charge chamber 122. The gas charge chamber 122 together with the diaphragm 130 constitutes the drive mechanism of the valve member 160.

Further, according to the embodiment illustrated in FIG. 5, the stopper member 140 to which the displacement of the diaphragm 130 is transmitted is constituted of a large diameter portion 140a and a small diameter portion 140b which are formed integrally, the circumference of the large diameter portion 140a extending outward and supported by the flange portion 111', and the circumference of the small diameter portion 140b being in contact with the inner wall of the tube member 110'. The lower area of the small diameter portion 140b comprises a cylindrical projection 140c, with the upper end of the shaft member 150 fit to the inner area of the projection. The lower end of the shaft member 150 is in contact with the valve member 160.

According to the present embodiment, the refrigerant supplied to the path 30 from the compressor travels into the valve chamber 161, expands via the orifice 180, and travels through the path 32 toward the evaporator. At this time, according to the temperature and pressure of the refrigerant traveling through the paths 34 and 36 leading to the compressor from the evaporator, the pressure of the refrigerant filled in the gas charge chamber 122 is changed, by which the diaphragm 130 is displaced, the movement being transmitted through the shaft member 150 and driving the valve member 160, which moves closer to or away from the opening 181 of the orifice member 180 and thereby controls the flow of refrigerant being supplied to the evaporator. Thereby, the same operation as the embodiment shown in FIG. 1 is achieved.

Moreover, the present invention is not limited to the case where the tube member and the flange are formed as separate members, but can be applied to the case where the tube member in the embodiment illustrated in FIG. 1 is separated at an appropriate area, and the separated tube members can be welded together to form the cassette unit.

Figure 6:
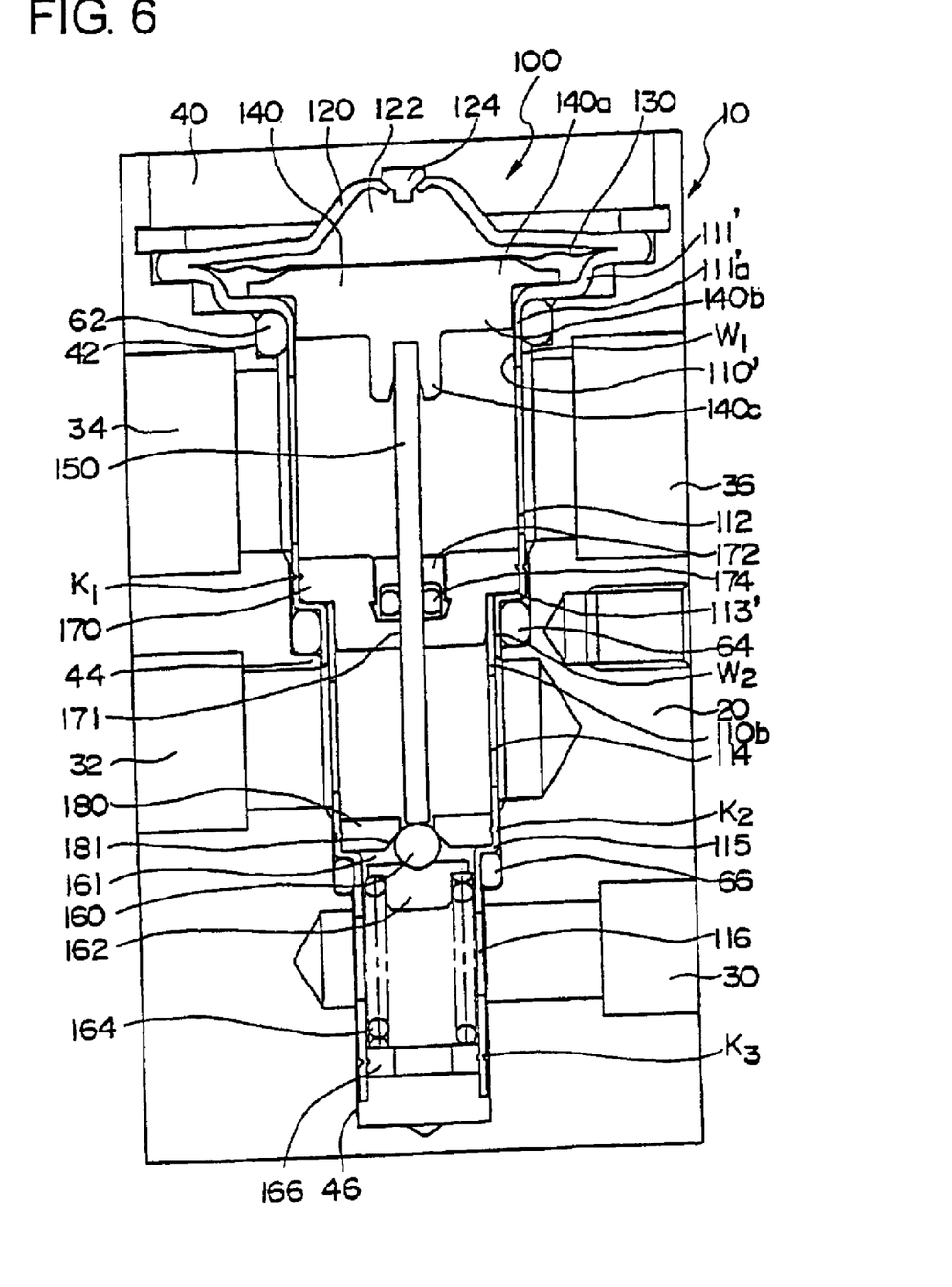
FIG. 6 is a cross-sectional view showing yet another example of the cassette unit of the present expansion valve.

Another embodiment of the present invention illustrated in FIG. 6 shows the case where separate tube members are welded together through welding, and in FIG. 6, the tube member 110 of FIG. 1 is formed as two separate members, a tube member 110a and a tube member 110b, wherein the tube members 110a and 110b are welded together at weld portion $W_2$ near a step portion 113' of the pipe member 110a by TIG welding and the like. In the example of FIG. 6, the pipe member 111a and a cylindrical portion 111'a of the flange portion 111' are formed integrally similar to the example of FIG. 1, but they can also be formed as separate members, as illustrated in FIG. 5, and welded together.

In FIG. 6, the same reference numbers as those used in the examples of FIG. 1 and FIG. 5 are assigned to identical or equivalent components, so detailed explanations thereof are omitted.

Further, the stopper member 140 shown in the examples of FIG. 5 and FIG. 6 can also be formed to have the same shape as the stopper member shown in the example of FIG. 1. In the examples shown in FIGS. 2, 3 and 4, the tube member and the flange can be formed as separate components as is shown in FIGS. 5 and 6, which are welded together when assembled. Moreover, the tube member can be formed as an assembly of plural parts which are welded together to form a single tube.

According to the embodiments shown in FIGS. 5 and 6, the seal member 62 disposed between the cassette 100 and the bore portion of the body 20 is positioned at the cylindrical portion 111'a of the flange portion 111'.

Now, the degree of freedom related to the design of the expansion valve according to the present invention will be explained with reference to FIGS. 7 through 10. In FIGS. 7 through 10, the components equivalent to those shown in FIG. 1 are provided with the same reference numbers, and the explanations thereof are omitted.

Figure 7:
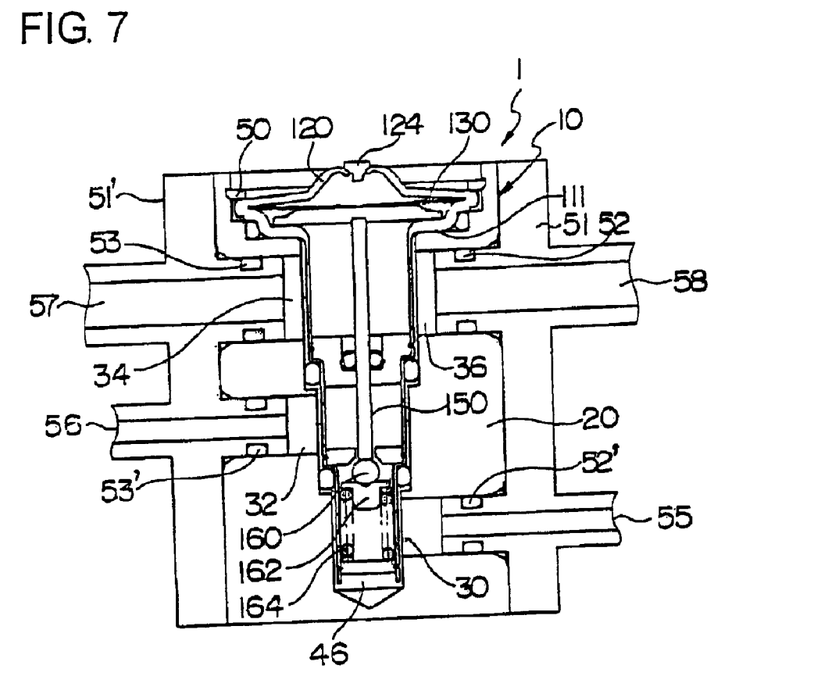
FIG. 7 is a cross-sectional view showing an example of the pipe arrangement of the present expansion valve.

FIG. 7 is a cross-sectional view showing an example of a flange connection adopted in mounting the expansion valve 1 explained in the embodiment of FIG. 1 to an evaporator, wherein flanges 51 and 51' are used to connect the refrigerant piping to the expansion valve 1. In the drawing, flanges 51 and 51'are assembled to the body 20 of the piping member 10 of the expansion valve 1 in an airtight manner via o-rings 52, 52' and o-rings 53, 53'. FIG. 6 illustrates how the expansion valve 1 is connected to the evaporator through this flange connection.

Figure 8:
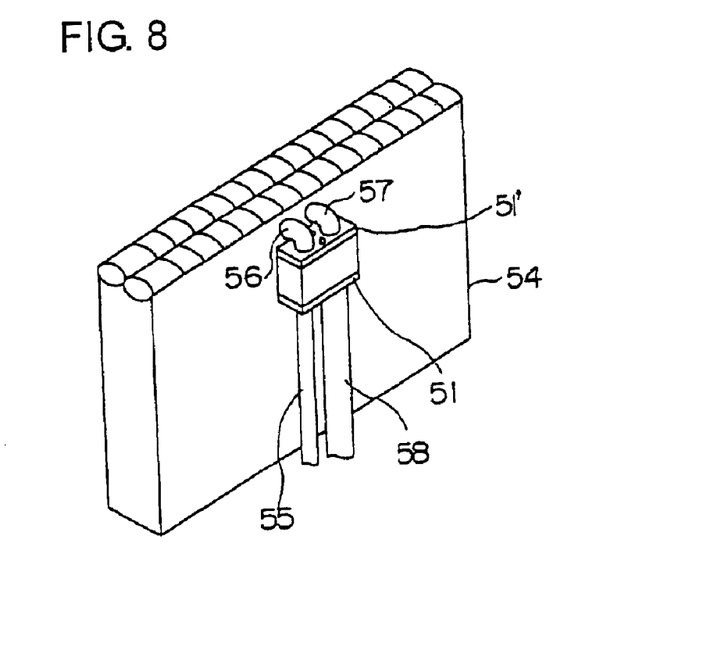
FIG. 8 is a cross-sectional view showing an example of the pipe arrangement according to the present expansion valve.

FIG. 8 is a drawing showing a sketch of how the expansion valve 1 shown in FIG. 1 is connected to an evaporator 54, wherein the refrigerant from a compressor not shown is introduced through a pipe 55 to the refrigerant path 30, then through the refrigerant path 32 and via a pipe 56 to the evaporator 54, and the refrigerant passing through the evaporator 54 and exiting therefrom travels through a pipe 57 into the refrigerant path 34, then through the refrigerant path 36 and via a pipe 58 toward the compressor. Each of the pipes 55 through 58 are connected to the flanges 51 and 51' by insertion or press fit. The pipes can also be formed integrally with the flanges.

Figure 9:
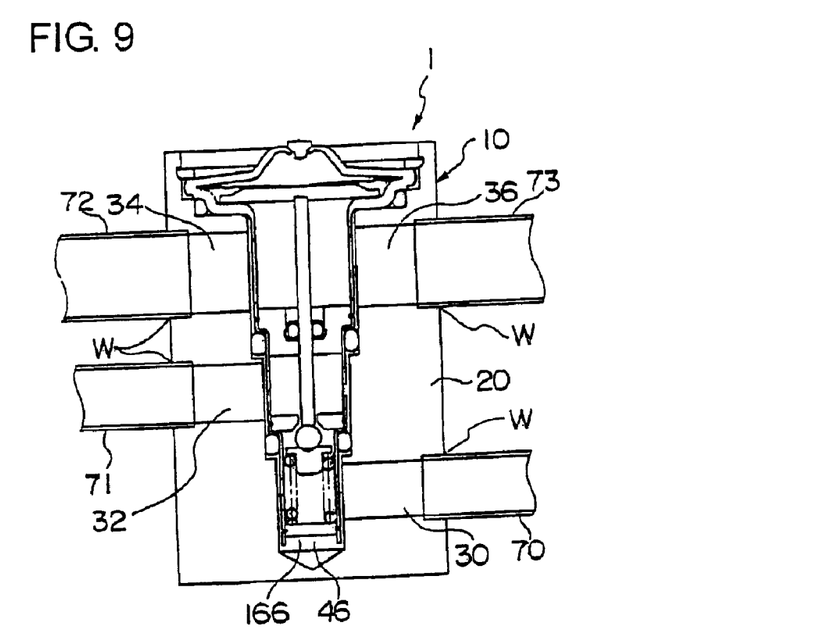
FIG. 9 is a cross-sectional view showing an example of the pipe arrangement of the present expansion valve.
Figure 10:
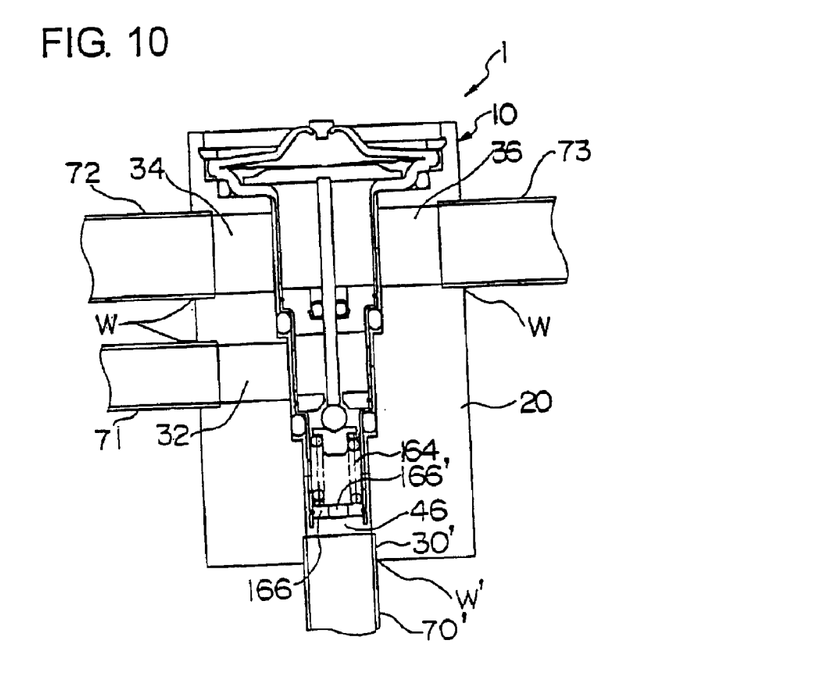
FIG. 10 is a cross-sectional view showing another example of the pipe arrangement of the present expansion valve.

FIGS. 9 and 10 show examples of how pipes are connected to the expansion valve 1 shown in the embodiment of FIG. 1, wherein the pipes are directly welded onto the body 20 of the piping member 10. In FIG. 9, pipes 70, 71, 72 and 73 made for example of aluminum are respectively connected to refrigerant paths 30, 32, 34 and 36 formed to the piping member body 20, and fixed thereto at weld areas W.

FIG. 10 shows an example of a pipe connection similar to what is shown in FIG. 9 but with the pipe 70 connected to the bore portion 46, wherein the piping member body 20 comprises a refrigerant path 30' leading to the bore portion 46 to which refrigerant from a compressor is supplied. A pipe 70' is welded onto the path 30' via a weld area W', by which the pipe is fixed to the piping member body 20. According to the example of FIG. 10, a through hole 166' is provided to the plate member 166.

Figure 11:
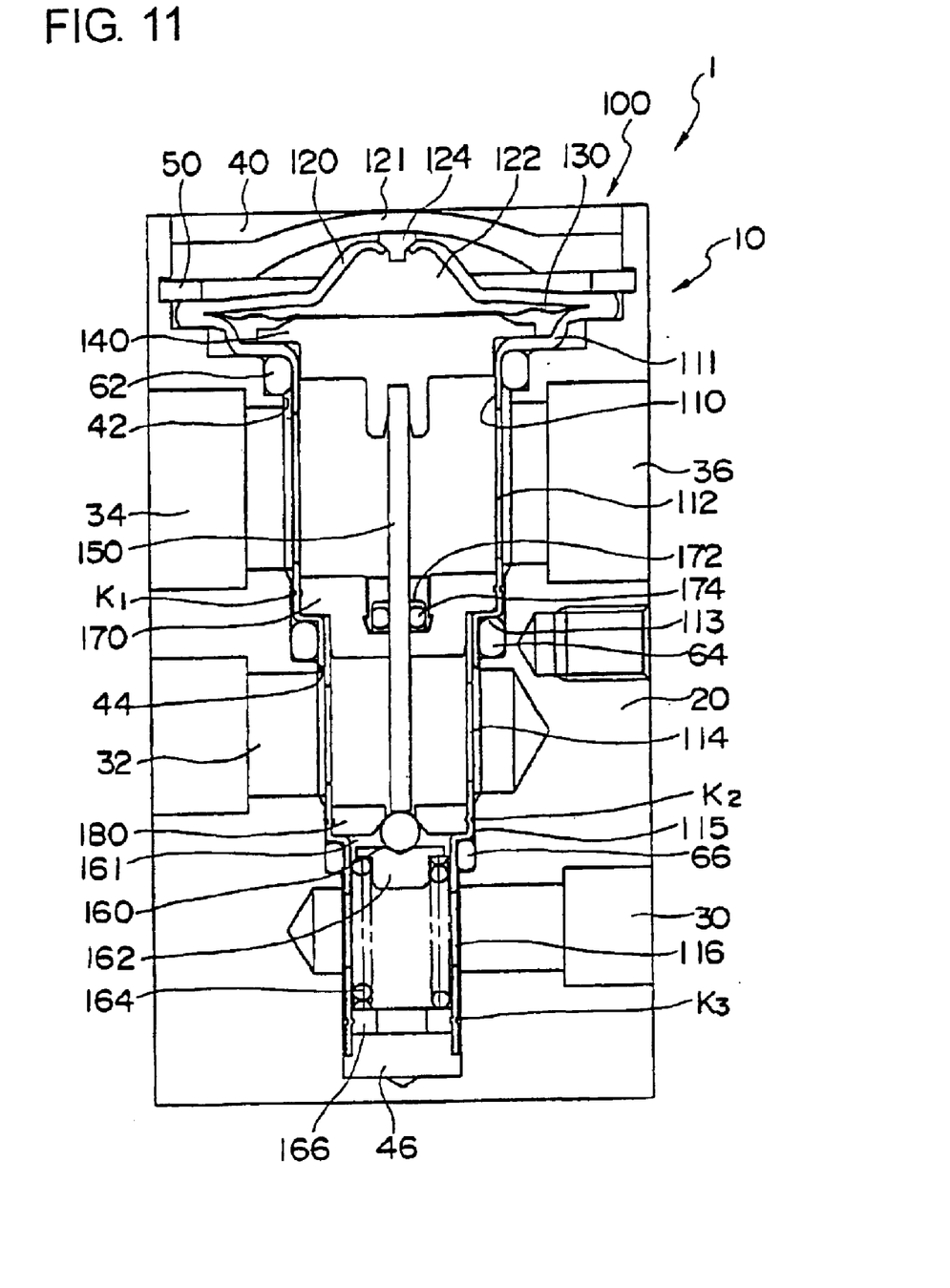
FIG. 11 is across-sectional view showing yet another example of the expansion valve according to the present invention.

According further to the present invention, it is possible to provide a protective cover 121 made of metal or resin or rubber to the lid member 120 in the embodiment of FIG. 1, as shown in FIG. 11.

In the example of FIG. 11, the components other than the protective cover 121 are identical to those of FIG. 1, so detailed explanations thereof are omitted.

The protective cover 121 of FIG. 11 can also be applied to embodiments other than the one shown in FIG. 1.

As explained, the expansion valve according to the present invention characterizes in forming as separate members a piping member to which pipes connecting the expansion valve and various components of the air conditioning device are connected and a cassette unit inserted to the piping member and having the functions of the expansion valve, and assembling the two members to form the expansion valve.

The method for connecting the refrigerant pipes to the piping member and the direction of the refrigerant paths formed to the piping member can be selected freely according to the layout of the air conditioning device to which the present expansion valve is applied, so according to the present invention, the degree of freedom of the design of the expansion valve is improved.

According to the present invention, the cassette unit structure can be simplified and the overall cost can be cut down.

What is claimed is:

1. An expansion valve comprising:

a flange portion; and a tube member formed separately from said flange portion;

said tube member having fixed to its interior a guide member, an orifice member and a plate member; said tube member further comprising a shaft member passing through said guide member and said orifice member and driving a valve member disposed within a valve chamber defined by said orifice member, a spring supported by said plate member and biasing said valve member toward said orifice member, a lid member sandwiching between said flange portion a diaphragm and defining a gas charge chamber, and a stopper member in contact with said diaphragm and transmitting the displacement of said diaphragm via said shaft member to said valve member; and at least one seal member, wherein said lid member is fixed to said flange portion with said diaphragm sandwiched therebetween, said flange portion and said tube member connected to each other, and said gas charge chamber together with said diaphragm constitutes a drive mechanism of said valve member and wherein said guide member and said tube member are fixed to each other by a crimp formed into an exterior surface of said tube member and said at least one seal member surrounds said guide member and said tube member while being disposed on or adjacent to the crimp and in contact with the exterior surface of said tube member.

2. An expansion valve according to claim 1, wherein said flange portion is integrated with said tube member through welding.

3. An expansion valve according to claim 1 or claim 2, wherein said flange portion and said lid member are fixed through welding.

4. An expansion valve according to claim 1, claim 2, wherein said orifice member and said plate member are fixed to said tube member through crimping.

5. An expansion valve comprising:

a flange portion; and a tube member connected to with said flange portion;

said tube member having fixed to its interior a guide member, an orifice member and a plate member; said tube member further comprising a shaft member passing through said guide member and said orifice member and driving a valve member disposed within a valve chamber defined by said orifice member, a spring supported by said plate member and biasing said valve member toward said orifice member, a lid member sandwiching between said flange portion a diaphragm and defining a gas charge chamber, and a stopper member in contact with said diaphragm and transmitting the displacement of said diaphragm via said shaft member to said valve member; and at least one seal member, wherein said lid member is fixed to said flange portion with said diaphragm sandwiched therebetween, said tube member being a separately formed tube member, and said gas charge chamber together with said diaphragm constitutes a drive mechanism of said valve member and wherein said guide member and said tube member are fixed to each other by a crimp formed into an exterior surface of said tube member and said at least one seal member surrounds said guide member and said tube member while being disposed on or adjacent to the crimp and in contact with the exterior surface of said tube member.

6. An expansion valve according to claim 5, wherein said separately formed tube member is integrated through welding.

7. An expansion valve according to claim 5, wherein said flange portion and said tube member are formed as separate components and then welded together.

8. An expansion valve according to claim 5 or claim 6, wherein said flange portion and said lid member are fixed together through welding.

9. An expansion valve according to any one of claims 5 through 7, wherein said orifice member and said plate member are fixed to said tube member through crimping.

10. An expansion valve according to claim 3, wherein said orifice member and said plate member are fixed to said tube member through crimping.

11. An expansion valve according to claim 8, wherein, said orifice member and said plate member are fixed to said tube member through crimping.

* * * * *